United States Patent Office 3,317,374
Patented May 2, 1967

3,317,374
2,4,5-TRICHLOROPHENOL REACTION PRODUCTS FOR THE TREATMENT OF SEEDS AND PLANTS
Marie Adele Josephe Bouillenne-Walrand, Liege, Belgium, and Francois Charles Marie Joseph d'Ogny, Paris, Georges Wetroff, Le Thillay, and Jean Emile Khaladji, Paris, France, assignors to Pechiney-Compagnie de Produits Chimiques et Electrometallurgiques, Paris, France
No Drawing. Filed June 7, 1962, Ser. No. 200,637
Claims priority, application France, June 9, 1961, 864,448
4 Claims. (Cl. 167—38)

This invention is in the field of agriculture and more particularly it relates to the treatment of phytopathological diseases provoked by parasitic micro-organisms and/or agricultural or plant growing activators.

It is known that chlorophenols, such as trichlorophenol, have fungus-destroying properties. However, such compounds have not been used for the protection of soil and plants against multifarious parasites because of their very corrosive nature. They cause rapid degradation of higher plant organisms and they also cause deterioration of the growing characteristics of the soil. In addition, the caustic character of the compounds makes them difficult to handle in agriculture for treatment of seeds, plant life and soil.

It is an object of this invention to provide a new and improved process for use in the treatment of soil, seeds and plant life without harmful effect on the soil, seeds or plant life, and it is a related object to provide a process of the type described wherein use is made of a material which is durable and stable; which is resistant to bad weather and precipitation so as to remain effective over a longer period of time, and which can be easily and efficiently handled for carrying out the treatment of seeds, plant life and soil without irritation or inflammation of the skin or undesirable effect on the respiratory tract of people associated in making the treatment.

The process embodying the features of this invention comprises the treatment of soil, seeds or plant life with the product formed by the combination of 2,4,5-trichlorophenol with an organic compound containing one or more electron donor radicals or donor groups. Suitable compounds containing electron donor radicals or groups comprise compounds having a radical or functional group in the form of a free electronic doublet such as an acyl group (RCO), an acyloxy group (RCOO), an amino group ($NH_2$), a hydroxyl group (OH), or a phospho group ($PO_2$), which may be generally defined as alcoholamines, phospho-amides and phospho-esters, such as alkyl phosphates, aryl phosphates, alkyl phthalates, and aryl phthalates.

More specifically, the process of this invention comprises the use of the reaction product of 2,4,5-trichlorophenol with at least one of the compounds selected from the group consisting of halogenated or unhalogenated alkyl phosphates, such as n-tributyl phosphate, tri-isobutyl phosphate; an aryl phosphate, such as triphenyl phosphate; and alkyl phthalate, such as n-dibutyl phthalate; and di-isobutyl phthalate; a phosphoric hexa-alkyl-amide, such as phosphoric hexamethyltriamide; an alcoholamine, such as triethanolamine, diethanolamine and the like.

The 2,4,5-trichlorophenol and the electron donor component are preferably combined in approximately equimolecular proportions, although one compound may be employed in an amount greater than equimolecular proportions by reference to the other except that the 2,4,5-trichlorophenol should not be employed in an amount greater than 10 percent in excess of the equimolecular proportion.

In the treatment of soil, seeds or plant life, in accordance with the practice of this invention, the 2,4,5-trichlorophenol—electron donor compound (hereinafter referred to as the active ingredient) can be supplied from solution in a liquid medium or carrier such as a volatilizable hydrocarbon, as represented by liquid ethane, butane, propane and the like; a halogenated hydrocarbon as represented by fluorochloro methanes, such as dichlorodifluoro methane, trichloromonofluoro methane, tetrachlorodifluoro ethane and the like; an ether oxide; a ketone such as acetone; an aldehyde such as benzaldehyde, or an ester such as ethyl acetate, isopropyl acetate, amyl acetate and the like, and alcohols such as ethyl alcohol, isopropyl alcohol, butyl alcohol and the like. It can be applied in the form of an emulsion or dispersion of the active ingredient in a non-toxic carrier liquid or it can be applied as a solid wherein the active ingredient is incorporated with an inert powder such as talc in finely divided form, or it can be formulated into a paste with a suitable viscous carrier or ointment.

It is desirable to make use of the active ingredient in a composition which is neither too acid nor too basic. For this purpose, it is desirable to maintain the pH of the composition containing the active ingredient below 9 and preferably at a pH within the range of 4 to 8. This can be accomplished by the adjustment of the pH of the composition with an acid to lower the pH or a base to increase the pH but it is preferred to effect the desired pH control by means of a conventional buffering agent or solution.

In practice, the protection and activation of growth of plant life can be achieved by treatment to apply from 10 grams to 5 kilograms of the active ingredient per hectare of culture and/or soil. The protection of seeds and activation of growth from the seeds can be achieved by the treatment to apply from 10 milligrams to 5 grams of the active ingredient per kilogram of seeds.

The concepts of this invention can be employed for the protection of the following list of agricultural materials, which list is given by way of illustration, but not by way of limitation, namely: market-gardening cultures, cereal plants, fruit trees, forest trees, vinyards, decorative plants, house plants and the like. Similarly all kinds of seeds can be treated, such for example as cotton, coffee, flax, leguminous and oleaginous seeds. In addition, in accordance with the practice of this invention, soil can also be treated for purposes of disinfecting or to rid the soil of parasites.

Application of the compositions containing the active ingredient for treatment of plant life, soil and seeds or the like agricultural materials as above defined, can be accomplished by various conventional means, such for example as by impregnation, spray coating, flow coating, dusting, soaking and the like.

The following will list some but not all of the pathogenic organisms found to be sensitive to the protective action of the active ingredient embodied in treating compositions of this invention:

(a) The viruses which are responsible for:

tobacco, potato and manioc mosaics,
wheat and ground-nut rosetta,
peach-tree and tomato chlorosis and witch-brooms,
citron-tree psorosis;

(b) The bacteria of the family:

of those responsible for the potato brown rot, citron-tree cankers, fruit-tree galls and tobacco blight,
of the bacilli (declining of apple and pear trees, rotting of cocoanut palm and carrot bud);

(c) The fungoid growths such as:

Pythiaceae (seedling damping off, rot of palm-tree buds and of cocoa-pods of cocoa trees, gummosis and cankers of citrus fruits),
Perisporiaceae (rotting of tobacco, bean, pea, oil palm-tree roots and collar),
Sphaeriaceae (speckles of apple-trees),
Moniliaceae (Sclerotinia partly responsible for seedling damping off—cabbage, flax, cotton plant and palm-tree fusariosis),
Sphaeropsideae (black foot rot of crucifers and other industrial plants),
Ustilagineae (smut),
Tilletiaceae (blight), and particularly:
Basidiomycetes (armilariella),
Mucedineae, such as Verticillium and Fusarium responsible for tracheomycoses including that of the cotton plant and other ones.

The following examples of the practice of the invention are given by way of illustration, but not by way of limitation.

*Example 1*

The active ingredient is prepared by reaction at ambient temperature between an equimolecular association of 2,4,5-trichlorophenol and tri-isobutyl phosphate. The product is formulated in solution in ethyl alcohol at 94% in an amount of approximately one part by weight of the active ingredient per 5,000 parts by weight of the alcohol. Cotton seeds are soaked in this solution for a period of time varying from 5 to 10 minutes.

20 tubes divided into 4 groups of 5 tubes each and containing 10 cm.$^3$ of agar-agar at 2% of potato dextrose are sterilized in an autoclave. Into each of the tubes of the first and second groups cotton seeds which have not been soaked in the active ingredient are introduced while seeds which have been submitted to the treatment with the active ingredient by immersion for 5 to 10 minutes, as above described, are introduced into the third and fourth group of tubes. The four groups of tubes are placed in natural light at an ambient temperature of about 21–24° C. and they are examined from day to day. On the twelfth day, the following results were observed:

TABLE I

| | Number of infected seeds | Immersion duration, min. |
|---|---|---|
| 1st series, reference blank plus untreated seed | 5 | |
| 2d series, reference blank plus alcohol at 94% plus untreated seed | 5 | |
| 3d series, treated seeds | 2 | 5 |
| 4th series, treated seeds | 1 | 10 |

The plantlets obtained from the seeds treated with trichlorophenol—isobutyl phosphate in the third and fourth groups of tubes are healthy by comparison with those obtained from the untreated seeds or from seeds merely soaked in alcohol at 94%, as a control.

*Example 2*

For the purpose of testing germination, alcoholic solutions are prepared of 2,4,5-trichlorophenol reacted with tri-isobutyl phosphate, as in Example 1, containing approximately 1 part by weight of active ingredient per 1000, 5000, and 10,000 parts by weight of alcohol.

Cotton seeds, after having been processed through a treatment by soaking in the alcoholic solution, are sown in seed pans containing non-sterilized vegetable mould. The seed pans are placed in a green-house the temperature of which is maintained at about 21° C. and they are exposed to artificial lighting which provides the wave lengths suitable for chlorophyllin synthesis of green vegetation. The duration of the lighting is for 14 hours per day. In the following table, each of the series set forth comprises 50 seeds except for the reference blank of untreated seeds which comprises 40 seeds:

TABLE II

| | | Immersion duration, min. |
|---|---|---|
| 1st series | Untreated reference blank | |
| 2d series | Seeds soaked in ethyl alcohol at 94% | 4 |
| 3d series | Seeds soaked in alcoholic solution at 1/1,000 of active product | 4 |
| 4th series | Seeds soaked in alcoholic solution at 1/5,000 of active product | 4 |
| 5th series | Seeds soaked in alcoholic solution at 1/10,000 of active product | 4 |

After 60 days the following results are observed:

The plantlets springing from seeds treated with the solution containing the active ingredient are more vigorous and their growth is more rapid. The series 3 and 4 were particularly vigorous in their growth. The 2,4,5-trichlorophenol reacted with tri-isobutyl phosphate plays an important part in the protection of the young plants against internal infections, at least during the early stages of development. This effect is combined with a stimulative action brought about by the active ingredient on the development of the plantlet itself.

*Example 3*

With a view towards protecting white mustard seeds against damping off of the seedling, an emulsion is prepared containing 0.5 gram per liter of water of an active ingredient comprising 2,4,5-trichlorophenol—tri-isobutyl phosphate, prepared as in Example 1. 100 grams of mustard seeds are treated by immersion in the emulsion for approximately 1½ minutes. The seeds are then sown in seed pans in a glass house containing vegetable mould previously enriched in pythium which is believed to be the main cause for the damping off of seedlings. At the germination of the seeds, it was found that there is practically no damping off. The active ingredient applied to the seeds obviously provides protection against damping off of the seedlings without introducing phytotoxicity or retardation in the germination of the seeds.

*Example 4*

With reference to the protection of beet seeds against beet black foot rot, a powder is prepared containing as the active ingredient 2,4,5-trichlorophenol reacted with tri-isobutyl phosphate, as in Example 1. 2 grams of the active ingredient is mixed with 98 grams of talc which is wet with acetone to form a paste. The paste is worked in order uniformly to distribute the active ingredient within the mass and then the acetone is removed, as by evaporation, and the resulting mass is reduced to a finely divided form.

In the meantime, beet seeds are treated by immersion in a culture medium of Phoma Betae which is a principal cause of beet black foot rot. The seeds thus treated are left to dry in air. An aliquot part is treated by powdering with the pulverulent material at the rate of 12 grams of the active ingredient per 100 kilograms of beet seeds. These seeds are then cultivated in mould seed pans. Another aliquot part, identical to the first, but without powdering with the pulverulent material containing the active ingredient, is also cultivated in mould seed pans for use as a reference. It is noted that the reference is affected by beet black foot rot while the aliquot part which has been treated by the active ingredient remains sound and healthy.

*Example 5*

A procedure identical to Example 4 has been effected but in which the 2,4,5-trichlorophenol is reacted with an equimolecular proportion of triethylamine to form the active ingredient. The results that are secured by the use of the active ingredient in the amounts and by the methods set forth in Example 4 are similar to those of the preceding Example 4.

Examples 6–15

For purposes of comparison, activity tests have been conducted wherein the ingredient used in producing the reactive component comprises 2,4,5-trichlorophenol in one case and pentachlorophenol in the other case. The reaction products subjected to the comparisons are set forth as follows:

(1) 2,4,5-trichlorophenol — tri-isobutyl phosphate _____ (I)
    Pentachlorophenol—tri-isobutyl phosphate __ (II)
(2) 2,4,5-trichlorophenol—triphenyl phosphate _ (III)
    Pentachlorophenol—triphenyl phosphate ___ (IV)
(3) 2,4,5-trichlorophenol—phosphoric hexamethyltriamide _____ (V)
    Pentachlorophenol—phosphoric hexamethyltriamide _____ (VI)
(4) 2,4,5-trichlorophenol—di-isobutyl phthalate_ (VII)
    Pentachlorophenol—di-isobutyl phthalate__ (VIII)
(5) 2,4,5-trichlorophenol—triethylamine _____ (IX)
    Pentachlorophenol—triethylamine _____ (X)

The products I to X are diluted approximately 5000, 10,000, 20,000, 40,000, 80,000 and 100,000 times in a medium having the following composition which is then employed in the treatment of cultures of different pathogenic fungoid growths of higher plant life:

Glucose _____ grams__ 60
Mycologic peptone _____ do____ 10
Agar-agar _____ do____ 20
Distilled water (quantity sufficient for) ___ cm.$^3$__ 1000

The treating composition is adjusted to a pH of 7 by means of disodium phosphate buffer. Instead of embodying the active ingredient to be compared in the desired dilutions in the foregoing medium, the active ingredient may be embodied in maltagar in the described dilutions. Equal quantities of mycelium of different fungoid growths are treated by the compositions described. After being in the drying oven at 26° C., the cultures are examined and the lethal concentration, i.e., the growth inhibition of the products I to X, is determined by observation of the cultures. The results are set forth in the following table:

Microorganisms:     Lethal concentrations of product XI
    Glomerella cingulata _____ 2,5.10$^{-5}$
    Macrophomina phaseoli _____ 2,5.10$^{-5}$ As indicated by the foregoing, the results that are secured by the use of active ingredients prepared with 2,4,5-trichlorophenol as a component of the reaction are of a class entirely different than that which is observed in the use of other phenolic compounds or chlorinated phenolic compounds such as 2,3,5-trichlorophenol, pentachlorophenols, as clearly indicated by the foregoing.

It will be understood that changes may be made in the details of the materials, their formulation and in their method of application, without departing from the spirit of the invention, especially as defined in the following claims.

We claim:

1. A process for treating seeds, soil and plant life comprising bringing the seeds, soil and plant life directly into contact with the product of the reaction of 2,4,5-trichlorophenol in substantial equimolecular proportion with an organic compound having at least one electron donor group in which the organic compound is selected from the group consisting of tributyl phosphate, tri-isobutyl phosphate and triphenylphosphate.

2. A process for treating seeds, soil and plant life comprising bringing the seeds, soil and plant life directly into contact with the product of the reaction of 2,4,5-trichlorophenol in substantial equimolecular proportion with phosphoric hexamethyltriamide.

3. A process for treating seeds, soil and plant life comprising bringing the seeds, soil and plant life directly into contact with the product of the reaction of 2,4,5-trichlorophenol in substantial equimolecular proportion with an organic compound having at least one electron donor group in which the organic compound is selected from the group consisting of n-dibutyl phthalate and di-isobutyl phthalate and combinations thereof.

4. A process for treating seeds, soil and plant life comprising bringing the seeds, soil and plant life directly into contact with the product of the reaction of 2,4,5-trichlorophenol and triethylamine.

TABLE III

| Microorganisms | Lethal concentrations of products I to X | | | | | | | | | |
|---|---|---|---|---|---|---|---|---|---|---|
| | I | II | III | IV | V | VI | VII | VIII | IX | X |
| Cercospora melonis | 10$^{-4}$ | 2.10$^{-4}$ | 5.10$^{-5}$ | 2.10$^{-4}$ | 5.10$^{-5}$ | 2.10$^{-4}$ | 5.10$^{-5}$ | 10$^{-4}$ | 2,5.10$^{-5}$ | 10$^{-4}$ |
| Cercospora beticola | 5.10$^{-5}$ | 2.10$^{-4}$ | 5.10$^{-5}$ | 2.10$^{-4}$ | 2,5.10$^{-5}$ | 2.10$^{-4}$ | 2,5.10$^{-5}$ | 10$^{-4}$ | 2,5.10$^{-5}$ | 2.10$^{-4}$ |
| Glomerella cingulata | 5.10$^{-5}$ | 2.10$^{-4}$ | 5.10$^{-5}$ | 2.10$^{-4}$ | 5.10$^{-5}$ | 10$^{-4}$ | 2,5.10$^{-5}$ | 10$^{-4}$ | 2,5.10$^{-5}$ | 10$^{-4}$ |
| Cochliobobus miyabeanus | 5.10$^{-5}$ | 2.10$^{-4}$ | | | | | | | | |
| Macrophomina phaseoli | 10$^{-4}$ | 2.10$^{-4}$ | 5.10$^{-5}$ | 2.10$^{-4}$ | 5.10$^{-5}$ | 10$^{-4}$ | 2,5.10$^{-5}$ | 2.10$^{-4}$ | 2,5.10$^{-5}$ | 10$^{-4}$ |

Example 16

2,4,5-trichlorophenol and triethanolamine (XI) in equi-molecular proportions, are reacted at ordinary temperature. The activity of the active ingredient has been examined on different cultures of fungoid growths under the same conditions as set forth with reference to Examples 6 to 15. The results, which are also expressed in the same way as in Examples 6 to 15, are set forth in the following table:

TABLE IV

Microorganisms:     Lethal concentrations of product XI
    Cercospora melonis _____ 5.10$^{-5}$
    Cercospora beticola _____ 5.10$^{-5}$

References Cited by the Examiner

UNITED STATES PATENTS

| | | |
|---|---|---|
| 1,919,298 | 7/1933 | Lehmann et al. __ 260—567.5 X |
| 2,253,762 | 8/1941 | Carswell et al. ____ 167—31 X |
| 2,502,809 | 4/1950 | Vogelsang _____ 167—38 X |
| 2,854,375 | 9/1958 | Shackell _____ 167—31 |
| 2,937,971 | 5/1960 | Shackell _____ 167—31 |

ALBERT T. MEYERS, *Primary Examiner.*

JULIAN S. LEVITT, *Examiner.*

D. B. MOYER, VERA C. CLARKE,
                                          *Assistant Examiners.*